United States Patent
Schaub et al.

(10) Patent No.: US 6,183,537 B1
(45) Date of Patent: *Feb. 6, 2001

(54) ROTARY BLOWERS FOR PRESSURE SWING ADSORPTION PROCESS AND SYSTEM

(75) Inventors: Herbert Raymond Schaub, East Amherst; John Harry Fassbaugh, Elma; James Smolarek, Boston; Michael Kenneth Rogan, Springville, all of NY (US)

(73) Assignee: Praxair Technology, Inc., Danbury, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/963,803

(22) Filed: Nov. 4, 1997

(51) Int. Cl.$^7$ .................................................. B01D 53/047
(52) U.S. Cl. ..................... 95/96; 95/103; 95/130
(58) Field of Search .......................... 95/101, 102, 96–98, 95/100, 103–105; 96/130, 143

(56) References Cited

U.S. PATENT DOCUMENTS

| | | | |
|---|---|---|---|
| 3,313,092 | * 4/1967 | Potts | 96/143 X |
| 3,498,025 | * 3/1970 | Bednarski | 95/102 |
| 4,425,142 | * 1/1984 | Mann | 96/130 X |
| 4,449,990 | * 5/1984 | Tedford, Jr. | 95/102 X |
| 4,534,346 | * 8/1985 | Schlaechter | 95/102 X |
| 4,539,020 | * 9/1985 | Sakuraya et al. | 95/101 |
| 4,781,735 | * 11/1988 | Tagawa et al. | 95/101 |
| 4,810,265 | * 3/1989 | Lagree et al. | 95/101 |
| 4,859,158 | 8/1989 | Weinbrecht | 418/9 |
| 4,892,565 | * 1/1990 | Schmidt et al. | 95/101 |
| 5,090,879 | 2/1992 | Weinbrecht | 418/9 |
| 5,122,164 | 6/1992 | Hirooka et al. | 55/26 |
| 5,370,728 | * 12/1994 | LaSala et al. | 95/101 |
| 5,407,465 | * 4/1995 | Schaub et al. | 95/101 X |
| 5,518,526 | * 5/1996 | Baksh et al. | 95/101 X |
| 5,520,720 | * 5/1996 | Lemcoff | 95/101 X |
| 5,529,611 | * 6/1996 | Monereau et al. | 95/101 |
| 5,540,758 | * 7/1996 | Agrawal et al. | 95/101 |
| 5,656,067 | * 8/1997 | Watson et al. | 95/101 |
| 5,656,068 | * 8/1997 | Smolarek et al. | 96/130 X |
| 5,658,371 | 8/1997 | Smolarek et al. | 95/101 |
| 5,679,134 | * 10/1997 | Brugerolle et al. | 96/130 X |

FOREIGN PATENT DOCUMENTS

038410A2    10/1981    (EP) .

* cited by examiner

*Primary Examiner*—Robert H. Spitzer
(74) *Attorney, Agent, or Firm*—Robert J. Follett

(57) ABSTRACT

The invention comprises a pressure swing adsorption process for the separation of a less adsorbable component from a mixture comprising the less adsorbable component and a more adsorbable component, the process comprising a cyclic adsorption/desorption process wherein the desorption step is at a selected pressure and occurs for a selected time such that a pressure reducing apparatus utilized to evacuate the gas does not require extraneous cooling.

11 Claims, 4 Drawing Sheets

ROTARY BLOWERS FOR PRESSURE SWING ADSORPTION PROCESS AND SYSTEM

FIELD OF THE INVENTION

This invention is directed to the field of gas separation by pressure swing adsorption (PSA), which when described herein shall also include vacuum pressure swing adsorption (VPSA) and vacuum swing adsorption (VSA). More particularly, the invention is directed towards reducing capital and operating costs in PSA systems through the use of particular rotary blowers.

BACKGROUND OF THE INVENTION

Two-bed PSA oxygen processes incorporate a vacuum step that is used to desorb nitrogen from the molecular sieve. During this vacuum step a Roots-type rotary blower is used. As the gas passes across the blower from a region of relatively low pressure to a region of relatively high pressure it is compressed, and consequently heated.

Table 1 illustrates typical heat of compression values (measured as $\Delta T_{rise}$=blower discharge temperature–blower inlet temperature) associated with steady state operation of a standard rotary blower. By the term "standard rotary blower" we mean a blower that is not capable of being cooled via external means. An example of such a blower is the RAS-J Whispair, available from Dresser Industries, Connorsville, Ind.

The data in Table I below is measured at an ambient pressure of 14.5 psia and ambient temperature of 70° F. The table represents steady state conditions.

TABLE 1

Performance Data for a Rotary Positive Blower having no external cooling

| $\Delta P$ = Inlet P − Outlet P (PSIA) | $\Delta T_{rise}$ |
|---|---|
| 0 | 7 |
| 0.5 | 13 |
| 1 | 19 |
| 1.5 | 26 |
| 2 | 33 |
| 2.5 | 42 |
| 3 | 51 |
| 3.5 | 61 |
| 4 | 72 |
| 4.5 | 84 |
| 5 | 98 |
| 5.5 | 113 |
| 6 | 131 |
| 6.5 | 151 |
| 7 | 175 |
| 7.5 | 202 |
| 8 | 234 |
| 8.5 | 272 |
| 9 | 318 |
| 9.5 | 375 |
| 10 | 447 |

As can be seen, as the difference between the pressure at the inlet of the blower and the outlet of the blower ($\Delta P$) increases, the heat of compression temperature at the outlet of the blower increases. This increase in temperature ($\Delta T_{rise}$) leads to the heating of the compressor components which, if excessive, result in breakdown of the compressor. Thus if a Roots-type blower has a rated temperature tolerance ($\Delta T_{max}$) of, for example, 230° F., this steady state $\Delta T$ value is exceeded at a steady state $\Delta P$ of about 8.

Unfortunately, typical PSA systems having one or more adsorbent beds may operate with $\Delta P$ values that are greater than about 8. Such systems are described in U.S. Pat. No. 5,658,371 (single bed), U.S. Pat. No. 5,518,526 (multi-bed) and in co-pending application Ser. No. 08/611,942 (multi-bed), all of the above being incorporated herein by reference. Typical $\Delta P$ values for the cycles disclosed in the above patents range from about 6 to 12 psia, preferably 7–11 psia, most preferably 8–10 psia.

Within the above ranges, the $\Delta P$ values for a two-bed system are greater than those for a single-bed system.

The problem of excessive $\Delta T$ has been addressed through the use of air or water cooled rotary blowers (e.g. blowers comprising additional means such that the compressor may be cooled via the use of external fluids) to lower the gas discharge temperature. Air cooled blowers are typically used with single bed systems, while water cooled blowers have been necessary for multi-bed systems. Examples of air cooled blowers may be found in U.S. Pat. Nos. 5,090,879 and 4,859,158. A commercially available blower of this type is the Roots DVJ Dry Vacuum Whispair Blower, available from Dresser Industries, Inc. in Connorsville, Ind. Other methods of cooling rotary blowers include the use of heat radiating fins, heat sinks and the like.

$\Delta P$ and steady state $\Delta T_{rise}$ values for a typical air cooled rotary blower are illustrated in Table 2. The data in Table II below is measured at an ambient pressure of 15 psia and ambient temperature of 70° F. This table represents steady state conditions.

TABLE 2

Performance Data for a Cooled Rotary Positive Blower

| $\Delta P$ = Inlet P − Outlet P (PSIA) | $\Delta T_{rise}$ |
|---|---|
| 0.5 | 5.2 |
| 0.98 | 10.6 |
| 1.46 | 17.8 |
| 1.95 | 23.2 |
| 2.43 | 30.4 |
| 2.91 | 39.4 |
| 3.4 | 48.4 |
| 3.88 | 57.4 |
| 4.36 | 66.4 |
| 4.85 | 77.2 |
| 5.33 | 89.8 |
| 5.82 | 100.6 |
| 6.3 | 113.2 |
| 6.78 | 125.8 |
| 7.75 | 152.8 |
| 8.23 | 167.2 |
| 8.72 | 181.6 |
| 9.2 | 196 |
| 9.68 | 210.4 |
| 10.17 | 226.6 |

As is apparent from these values, a cooled blower allows for operation at greater $\Delta P$ than a non-cooled blower; and $\Delta T_{max}$ of 230° F. is not exceeded until $\Delta P$ of greater than about 10 is achieved. Thus it is apparent from the available data that if one wished to operate a process having a $\Delta P$ between about 8 to 10, then a cooled blower would be presumed to be required.

Unfortunately, such blowers have higher operating and capital costs. In addition, water cooled blowers require the availability of water to inject into the blower housing and in many cases water is not readily available. In addition, the cooling water causes scale to form on the blower end plates and rotors which cause mechanical problems for the blower.

OBJECTS OF THE INVENTION

It is therefore an object of the invention to determine a VPSA operating process whereby a standard rotary blower may be used in place of a cooled rotary blower. This would allow for improved efficiency and lower capital cost.

SUMMARY OF THE INVENTION

This invention comprises a PSA process for the separation of a less adsorbable component from a mixture comprising said less adsorbable component and a more adsorbable component, said process comprising the cyclic performance of the following:

a) introducing a mixture into a feed end of a vessel which contains a material capable of selectively adsorbing said more adsorbable component, whereby the pressure in said vessel increases;

b) an adsorption step comprising adsorbing at least a portion of said more adsorbable component and recovering at least a portion of said less adsorbable component;

c) a desorption step comprising desorbing said more adsorbable component from said adsorbent material by evacuation of gas from said vessel, wherein said evacuation is at a selected pressure and occurs for a selected time such that a pressure reducing means utilized to evacuate said gas does not require extraneous cooling.

In a preferred embodiment the pressure reducing means comprise a rotary positive blower.

In another preferred embodiment a step time for said evacuation is less than 60 seconds.

In another preferred embodiment, the pressure reducing means has a particular temperature tolerance, and wherein said desorption step is operated under such pressure and time conditions so as to prevent said temperature tolerance from being exceeded.

In another preferred embodiment the total cycle time is between 10 and 180 seconds, the pressure ratio is between 2:1 and 6:1.

In another preferred embodiment, said desorption step lasts between 5 and 90 seconds.

The invention also comprises a PSA apparatus for the separation of at least one non-preferentially-adsorbable first gas from a gas mixture containing said first gas and one or more selectively-adsorbable second gas(es), comprising at least one adsorption bed unit containing a composition capable of selectively adsorbing said second gas(es) from said gas mixture at an elevated pressure, a receptor unit communicating with the downstream end of said bed unit through a control valve, to receive a pressurized supply of said first gas from the adsorption bed unit, a pressure-equalization unit for discharging void gas through a control valve into the downstream end of said adsorption bed unit to reduce the pressure therein and cause the desorption and depressurization of said second gas(es) therefrom, and compressor means for supplying a relatively-pressurized gas mixture through a control valve to the upstream end of the adsorption bed unit, means for causing the first gas to flow from said adsorption bed unit to said receptor unit when the pressure in the former exceeds the pressure in the latter, to collect the produced first gas, means for causing the depressurization and release of residual void gas present in said adsorbent bed unit through a control valve into said pressure-equalization unit after the supply of the pressurized gas mixture is discontinued to said adsorbent bed unit, and pressure reducing means communicating with the upstream end of the adsorbent bed unit for depressurizing the adsorbent bed unit to a low pressure, wherein said pressure reducing means comprises a rotary positive blower having a predetermined steady state temperature tolerance, wherein if said blower were operated at a steady state, said tolerance would be exceeded.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
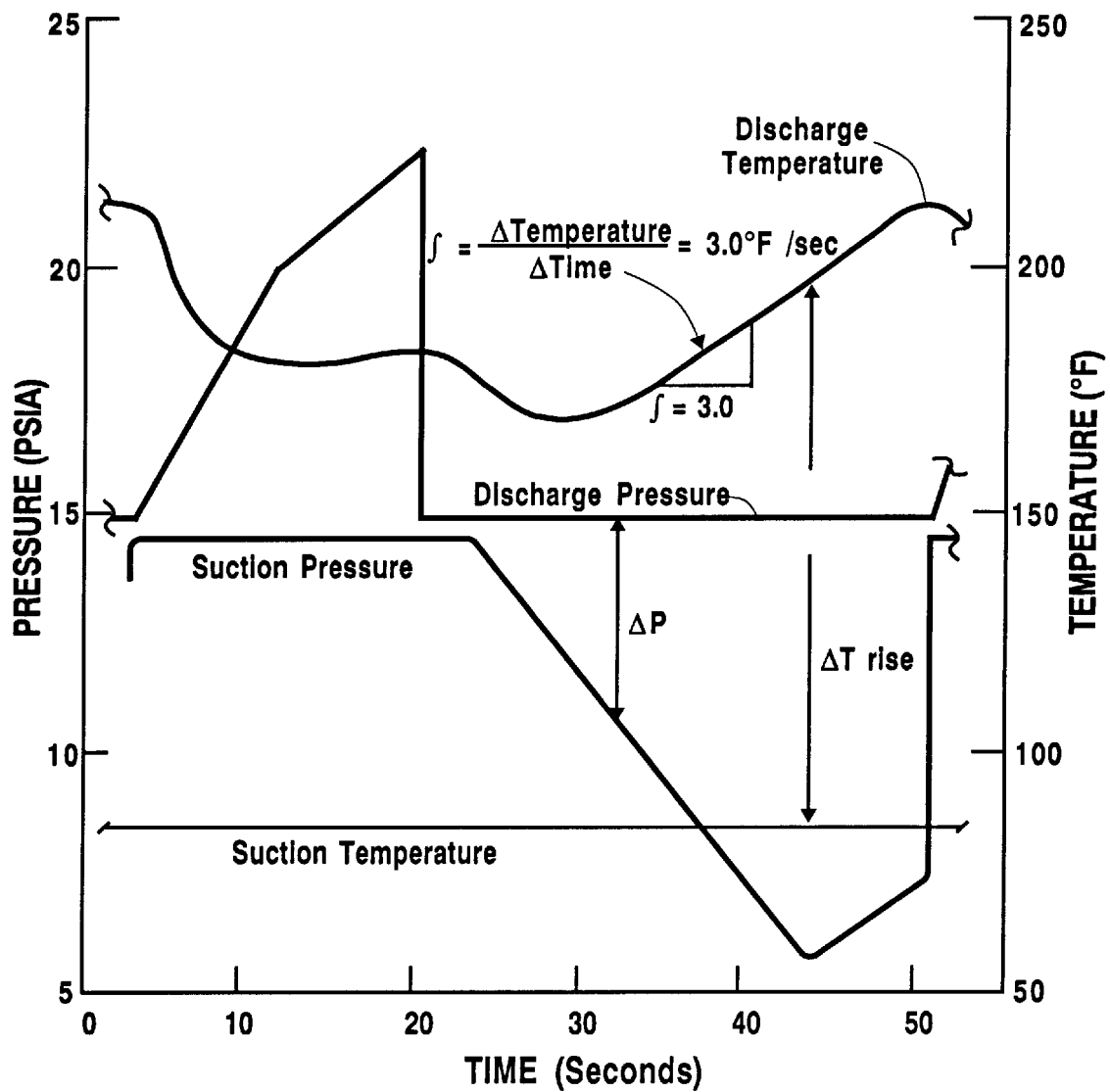
FIG. 1 is a graphical representation of non-cooled rotary positive blower performance for a typical single bed VPSA system.

The invention may be accomplished by operating a one or two-bed PSA apparatus within certain cycle time and pressure parameters such that the rotary blower utilized in the process does not require extraneous cooling. The invention is based upon the recognition that the selection of a particular blower is dependent upon the length and pressure ranges of the heat generating desorption or evacuation steps versus length and pressures of the other non-heat generating (e.g. adsorption) or cooling steps in the process cycle.

Thus, by operating within certain prescribed adsorption and desorption parameters, air or water cooled rotary blowers are not necessary. Instead, standard non-cooled rotary positive (e.g. ROOTS®-type) blowers may be utilized in PSA processes, resulting in considerable savings in capital and operating costs.

The invention is applicable to single and multi-bed (preferably two bed) systems. While the invention is generally described with respect to adsorption and desorption steps, those skilled in the art will recognize that the invention is not limited to processes having only these steps. Other steps such as equalization may be included and are generally described in the aforementioned patents and applications that have been incorporated by reference.

As discussed above, in order to utilize a standard rotary blower, the overall $\Delta T_{rise}$ (suction to discharge temperature) must be maintained below the machine's temperature tolerance level ($\Delta T_{max}$). We have found that this result can be achieved by controlling the amount of time that the blower is in the feed and vacuum steps, and the blower pressure ranges occurring during these respective steps.

For a single bed process (such as that described in U.S. Pat. No. 5,658,371), a blower may have an average suction pressure of between 9 to 14.7 psia, preferably about 14 to 14.5 psia, most preferably about 14.5 psia; and a maximum discharge pressure of about 20 to 25 psia, preferably 22–23 psia and most preferably about 22.7 psia during the feed/ adsorption step(s). As for the evacuation/desorption step(s), the minimum suction pressure may be about 5–9 psia, preferably 6 to 7 psia and most preferably about 6.05 psia while the average discharge pressure was preferably 9–15 psia, preferably 14 to 15 psia and most preferably about 14.7 psia.

For a two bed system (for example that disclosed in co-filed application D-20,335—Single Stage Vacuum Pump, the contents of which are herein incorporated by reference), a feed blower may have an average suction pressure of about 14.7 psia, and a maximum discharge pressure of between 20–25 psia. A vacuum blower may have a maximum suction pressure of between about 6–12 and an average discharge pressure of about 14.7 psia.

Generally, total adsorption/desorption cycle times for the single and multi-bed PSA systems above may range from 10 to 180 seconds. Cycle times for each of the feed step(s) and for the evacuation only portions of the cycle may be about half the total cycle time, thus these range from less than 90 seconds; typically from 5 to 90 seconds, preferably 10 to 30 seconds and more preferably, 17 to 22 seconds total. Such systems may operate at an adsorption/desorption pressure ratio of between 2:1 to 6:1.

As indicated above, selection of blowers for such processes has, prior to the invention, been based upon evaluation of the maximum ΔP for given processes. We have found that such evaluation is inaccurate. Instead, we have found that it is necessary to evaluate the average ΔP for a given process, in conjunction with the actual evacuation or desorption time as compared to the overall cycle. Following a discussion on how this new approach was derived, we will present guidelines for practicing the invention.

FIG. 1 illustrates the changes in temperature and pressure with a typical single bed VPSA cycle practiced following the '371 patent. In the illustrated process the blower has an average suction pressure of 14.5 psia and a maximum discharge pressure of about 22.7 psia during the feed steps, and a minimum suction pressure of about 6 psia and an average discharge pressure of about 14.7 psia during the evacuation step. The process has an average ΔP of about 5 over the entire cycle, and a maximum ΔP of about 9. Thus one would expect that, for rotary blowers of the type illustrated in the Tables above, a cooled blower would be required, given the maximum ΔP.

However, as shown in the Figure, the resulting maximum temperature rise (e.g. $\Delta T_{rise}$) across the machine is 214° F.–85° F.=129° F., which is well below the $\Delta T_{max}$ of 230° suggested in the above discussion. The reasons for this are two-fold.

First, as shown in the Figure, the discharge temperature (and therefore $\Delta T_{rise}$) increases at it's maximum rate (i.e. has its steepest positive slope) only during the evacuation portion of the cycle. Indeed, for the illustrated cycle, the average rise in discharge temperature for the standard rotary blower during the evacuation step was calculated to be 3.0° F./second. Further, the discharge temperature actually decreases from its maximum value during the other (non-evacuation) steps of the cycle as can be seen from Time=0 to about 30 seconds in the Figure.

Thus evaluation of actual cycle parameters shows that rather than using a direct correlation between the maximum ΔP of the process and its associated $\Delta T_{rise}$ (e.g. from Table 1), one should also consider the length of evacuation vs. total cycle time in combination with the rate of increase of discharge temperature during evacuation.

Figure 2:
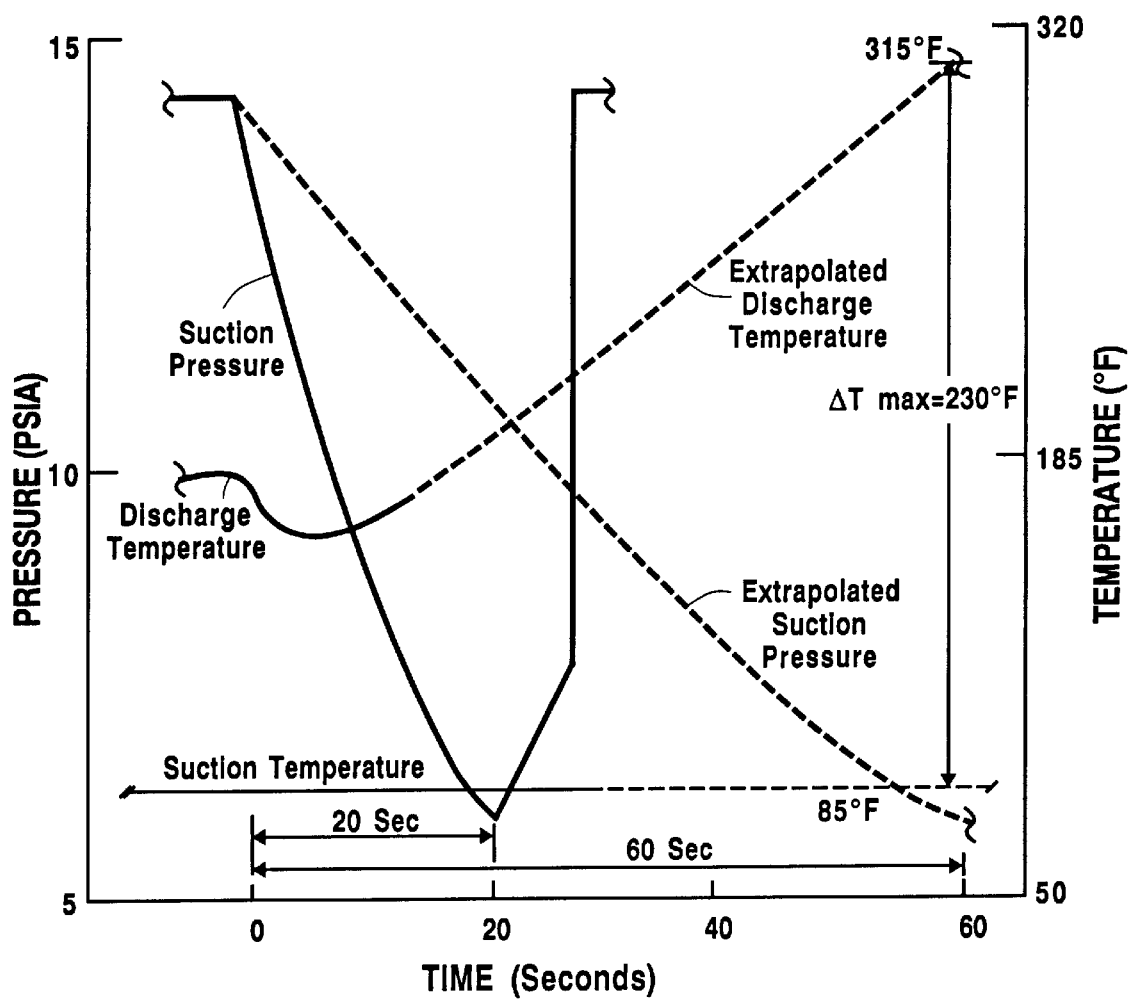
FIG. 2 is a schematic graphical representation of non-cooled blower performance that illustrates extrapolated temperature and pressure values during evacuation during the use of a non-cooled rotary positive blower in a single bed VPSA system.

In FIG. 2, a line was extrapolated using the above rate of temperature rise in blower discharge temperature (e.g. 3° F./sec) in order to determine the amount of time that the blower had to be in the evacuation step to exceed the machine's temperature tolerance (e.g. $\Delta T_{MAX}$=230° F.). (Note that as compared to FIG. 1, Time=0 seconds in FIG. 2 corresponds to time=20 seconds in FIG. 1). FIG. 2 shows that for the process illustrated above the total evacuation time permitted prior to exceeding the 230° F. threshold would be about 60 seconds.

Thus a single bed PSA system (such as that in U.S. Pat. No. 5,658,371) that is run with a total cycle of less than 30–70 seconds, preferably about 50 seconds with an evacuation step that is 5 to 30 seconds, preferably 15 to 25 seconds and most preferably about 20 seconds would be expected to be able to achieve the required vacuum pressure levels through the use of a standard rotary blower. Indeed, such a cycle could even be expected to utilize an evacuation step of up to about 60 seconds before violating a standard blower's temperature tolerances ($\Delta T_{max}$).

Figure 3:
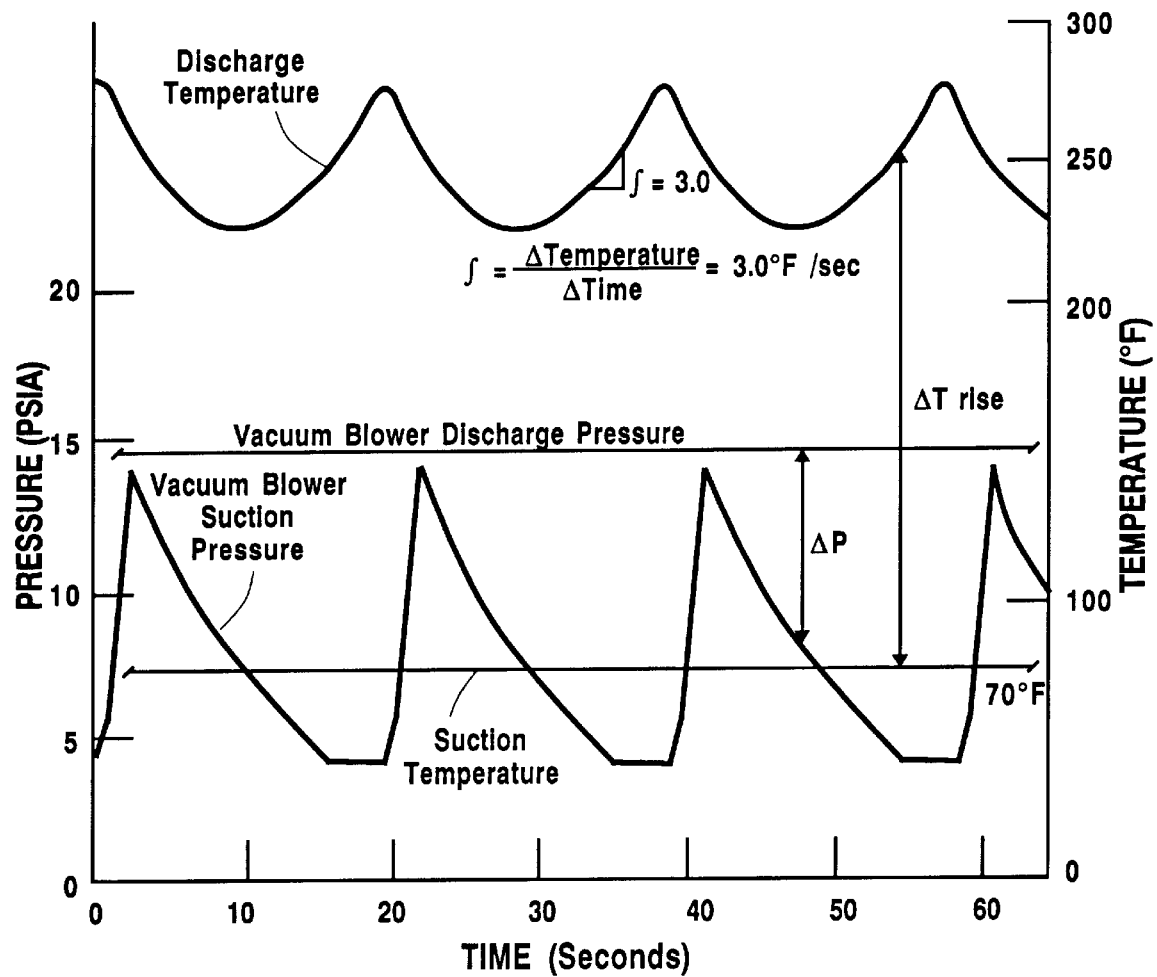
FIG. 3 is a graphical representation of non-cooled rotary positive blower performance for a typical two bed VPSA system.

Similar results may be obtained with a two-bed PSA system. FIG. 3 shows the $\Delta T_{rise}$ and ΔP curves associated with a typical two bed system (such as that disclosed in D-20,335). In that system the average ΔP is about 7, with a maximum ΔP value of about 9. As with the single bed system, a value of 3.0° F./second was measured as the average rise in discharge temperature for the standard rotary blower during the evacuation step.

Figure 4:
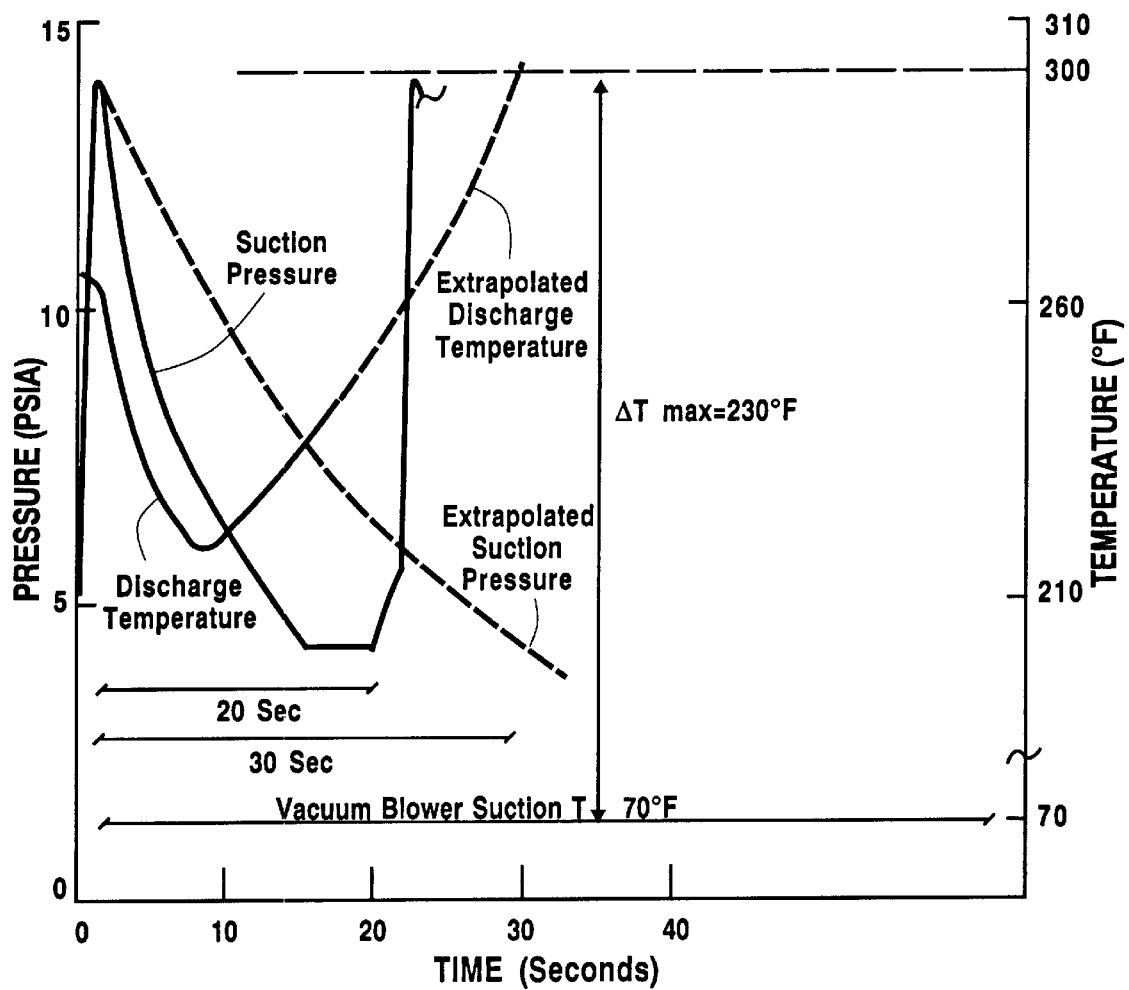
FIG. 4 is a schematic graphical representation of non-cooled blower performance that illustrates extrapolated temperature and pressure values during evacuation during the use of a non-cooled rotary positive blower in a two bed VPSA system.

In FIG. 4, a line was extrapolated using this rate of temperature rise in order to find the amount of time that the blower had to be in the evacuation step to exceed the blower's temperature tolerance $\Delta T_{MAX}$=230° F.). (As compared to FIG. 3 , Time=0 seconds in FIG. 4 corresponds to time 20 sec in FIG. 3).

FIG. 4 shows that for the process described above, the total evacuation time permitted prior to exceeding a 230° F. tolerance would be about 30 seconds. Such a process is typically run with a cycle that ranges over a period of 15 to 40 seconds, preferably about 25 seconds with an evacuation only step that is 5 to 20 seconds, preferably 7 to 18 and most preferably about 13 seconds.

Thus, a non-cooled rotary blower (as opposed to a cooled blower) may be used to achieve the appropriate vacuum pressure levels before violating blower temperature tolerances. Since the vacuum blower cycles with a maximum pressure difference of about 14.7 psia to 6–12 psia pressure swing over 20 seconds of evacuation, this cyclic change in blower suction pressure would similarly alleviate the chance for violation of machine temperature tolerances.

Thus from evaluation of actual data, the following relationship has been derived. This equation is based upon average cycle ΔP across the blower; the cycle including peak ΔP levels which would result in steady state operating temperatures exceeding blower capability.

Formula 1

$$[(T_{AS}+\Delta T_{max})-[\Delta T_{rise}+T_{AS}+(t_{HEAT}*\Delta T_{rise}/t)]]/(\Delta T_{rise}/t)+t_{TOTAL}=t_{allowed}$$

wherein:

$T_{AS}$=Ambient suction temperature (typically 70° F.);

$\Delta T_{max}$=Maximum rated temperature of blower;

t=Time in seconds;

$\Delta T_{rise}$=Blower rise in temperature for given ΔP (the average ΔP for the cycle);

$t_{HEAT}$=actual time of blower heating during desorption (for a typical cycle this is about 40% of total cycle time);

$t_{TOTAL}$=Total time of desorption step in originally designed cycle (e.g. 20 seconds);

$t_{allowed}$=Total time actually permitted for adsorption or desorption (e.g. $t_{TOTAL}$+additional time permitted with cyclic operation).

Each of $\Delta T_{max}$, $\Delta T_{rise}$ and $\Delta T_{rise}/t$ will vary depending upon the particular rotary blower selected. Further, $t_{HEAT}$ and $t_{TOTAL}$ are dependent upon the particular cycle selected. The determination of each of these values is well within the abilities of the skilled artisan. Thus the above formula may be applied to other PSA systems having one or more beds in order to determine process and blower limitations applicable to that system.

The following Table 3 is derived using the above formula and data used in this application. This provides general guidelines for PSA processes using a standard rotary blower having the characteristics described above, and shows how $t_{allowed}$ will vary depending upon the average $\Delta P$ of the cycle. It assumes $\Delta T_{max}$=230 F.; $T_{AS}$=70° F.; $\Delta T_{rise}$ is taken from Table 1 using the appropriate average cycle $\Delta P$; $\Delta T/t$=3.0° F./sec.; $t_{TOTAL}$=20 seconds and $t_{HEAT}$=8 seconds.

TABLE 3

| Average Cycle $\Delta P$ | $t_{allowed}$ (seconds) | $\Delta T_{rise}$ (° F.) (from Table 1) |
|---|---|---|
| 3 | 72 | 51 |
| 3.5 | 68 | 61 |
| 4 | 65 | 72 |
| 4.5 | 61 | 84 |
| 5 | 56 | 98 |
| 5.5 | 51 | 113 |
| 6 | 45 | 131 |
| 6.5 | 38 | 151 |
| 7 | 30 | 202 |

As implied above, the above approach for determining optimum blowers and operating conditions may be applied for different systems having one or more beds and having cycle times ranging from 10 to 180 seconds, with desorption step times being about half of the total cycle time.

Numerous benefits may be obtained with the use of a standard rotary blower as opposed to a cooled blower in a VPSA. For example, in a single-bed system, the standard blower provides about a 3% higher oxygen product flow rate (at a set purity of 90% $O_2$). In addition, a savings of about 9% on unit power is achieved by using the standard rotary blower as compared to the cooled blower. Further, by using the standard rotary blower about 4.5% more gas can be processed at a horsepower savings of about 7%. Finally, by using the standard rotary blower as opposed to the injection port cooled blower, a savings of greater than about 40% on the capital cost of the blowers can be achieved.

As for the benefits that could be achieved by using a "dry" (e.g. non-water cooled) standard rotary blower as opposed to a water-injected single stage rotary blower in a multi-bed system, the main concern is availability of water to inject into the blower housing. Typically, a customer is either hesitant to provide the water at the flow rate necessary to run the blower or the VPSA is placed in a location where water is not readily available. This is obviously not a problem with the "dry" machines. Also, the cooling water causes scale to form on the blower end plates and rotors which cause mechanical problems for the blower while the dry machines would experience none of these types of problems.

The invention is applicable to PSA systems using axial, radial or lateral flow beds and to plant size ranges from 1–200 TPD. The PSA process and apparatus of the system may use any type of equilibrium-selective adsorbent material including, but not limited to, A-zeolite, X-zeolite, Y-zeolite, chabazite, mordenite, and various ion exchanged forms of these, as well as silica-alumina, alumina, silica, titanium silicates, phosphates and mixtures thereof. A preferable adsorbent includes highly exchanged sodium zeolites X having a framework SiO2/Al2O3 ratio between 2.0 and 2.5 having at least 88% and preferably at least 95% of their AlO2 tetrahedral units associated with lithium cations. Preferred among the foregoing are those having a silica/alumina ratio as close to 2.0 as possible and as high a lithium exchange as possible.

Specific features of the invention are shown in one or more of the drawings for convenience only, as such feature may be combined with other features in accordance with the invention. Alternative embodiments will be recognized by those skilled in the art and are intended to be included within the scope of the claims.

We claim:

1. A two-bed pressure swing adsorption process for the separation of a less adsorbable component from a gas mixture comprising said less adsorbable component and a more adsorbable component, said process comprising an adsorption/desorption cycle having the following steps:
   a) introducing said gas mixture into a feed end of a vessel which contains a bed of material capable of selectively adsorbing said more adsorbable component, whereby pressure in said vessel increases;
   b) an adsorption step comprising adsorbing at least a portion of said more adsorbable component and recovering at least a portion of said less adsorbable component;
   c) a desorption step comprising desorbing said more adsorbable component from said adsorbent material by evacuation of gas from said vessel, wherein said process uses a rotary blower having a rated temperature that is less than or equal to $\Delta T_{max}$, where:

$$\Delta T_{max} \leq \Delta T_{rise}/t*(t_{ALLOWED}-t_{TOTAL}+t_{HEAT})+\Delta T_{rise}$$

wherein:
$\Delta T_{max}$=Rated temperature tolerance of said rotary blower;
t=Time in seconds;
$\Delta T_{rise}$=Rise in temperature associated with the average $\Delta P$ (inlet pressure of said rotary blower–outlet pressure of said rotary blower) of said cycle;
$t_{HEAT}$=Time said rotary blower is heated during said desorption step;
$t_{TOTAL}$=Total time of said desorption step;
$t_{allowed}$=Total cycle time for said cycle
wherein operation of said blower at steady state conditions at the maximum $\Delta P$ (inlet pressure of said rotary blower–outlet pressure of said rotary blower) would result in blower temperatures in excess of $\Delta T_{max}$.

2. The process of claim 1, wherein said desorption step is less than 60 seconds.

3. The process according to claim 1, wherein $t_{allowed}$ is between 10 and 180 seconds.

4. The process of claim 1, wherein said desorption step lasts between 5 and 90 seconds.

5. The process of claim 1, wherein said blower does not require external cooling.

6. The process of claim 1, wherein said gas mixture is air and said less adsorbable component is oxygen.

7. The process of claim 1, wherein said process has an adsorption:desorption pressure ratio of between 2:1 and 6:1.

8. The process of claim 1, wherein said less adsorbable component is oxygen.

9. The apparatus of claim 1, wherein said vessel is selected from the group consisting of radial flow, axial flow and lateral flow vessels.

10. The apparatus of claim 1, wherein said material capable of selectively adsorbing said more adsorbable component from said gas mixture is selected from the group consisting of A-zeolite, X-zeolite, Y-zeolite, chabazite, mordenite, silica-alumina, alumina, silica, titanium silicates, phosphates and mixtures thereof.

11. The apparatus of claim 1, wherein said material capable of selectively adsorbing said more adsorbable component from said gas mixture is sodium zeolite X having a framework $SiO_2/Al_2O_3$ ratio between 2.0 and 2.5 and having at least 88% of its $AlO_2$ tetrahedral units associated with lithium cations.

* * * * *